(12) United States Patent
Horii et al.

(10) Patent No.: US 12,524,072 B2
(45) Date of Patent: Jan. 13, 2026

(54) PROVIDING A PASS-THROUGH VIEW OF A REAL-WORLD ENVIRONMENT FOR A VIRTUAL REALITY HEADSET FOR A USER INTERACTION WITH REAL WORLD OBJECTS

(71) Applicant: Samsung Electronics Co., Ltd., Suwon-si (KR)

(72) Inventors: Hiroshi Horii, Pleasanton, CA (US); Edgar Charles Evangelista, San Jose, CA (US); Ajinkya Waghulde, Castro Valley, CA (US); Yujie Jiang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/817,166

(22) Filed: Aug. 27, 2024

(65) Prior Publication Data
US 2025/0076977 A1    Mar. 6, 2025

Related U.S. Application Data

(60) Provisional application No. 63/536,343, filed on Sep. 1, 2023.

(51) Int. Cl.
*G06F 3/01* (2006.01)
*G06T 19/00* (2011.01)
*G06T 19/20* (2011.01)

(52) U.S. Cl.
CPC ............ *G06F 3/013* (2013.01); *G06T 19/006* (2013.01); *G06T 19/20* (2013.01); *G06T 2219/2016* (2013.01); *G06T 2219/2021* (2013.01)

(58) Field of Classification Search
CPC ........ G06F 3/011; G06F 3/013; G06T 19/006; G06T 19/20; G06T 2219/2016; G06T 2219/2021
See application file for complete search history.

(56) References Cited

U.S. PATENT DOCUMENTS

| 9,865,089 B2 | 1/2018 | Burns et al. |
| 10,311,638 B2 | 6/2019 | Da Veiga et al. |

(Continued)

FOREIGN PATENT DOCUMENTS

| JP | H10-206787 A | 8/1998 |
| KR | 10-1917359 B1 | 1/2019 |
| WO | 2017120917 A1 | 7/2017 |

OTHER PUBLICATIONS meta.com, "Use Passthrough on Meta Quest," accessed Jul. 9, 2024, https://www.meta.com/help/quest/articles/in-vr-experiences/oculus-features/passthrough/.

(Continued)

*Primary Examiner* — Nelson M Rosario

(57) ABSTRACT

A method performed by a virtual reality (VR) head mounted device (HMD) includes displaying, by a display of the HMD, a VR environment, obtaining, by a processor of the HMD, a video feed of an external environment from an exterior-facing camera of the HMD, and determining, by the processor, to activate one of a plurality of pass-through modes for the video feed based on at least one of a user input or a state of the external environment, wherein the plurality of pass-through modes have different transparencies, different resolutions, or both. The method further includes rendering, by the processor based on the activated pass-through mode, the video feed for overlay onto at least a portion of the VR environment, and displaying, by the display, the rendered video feed overlaid onto the portion of the VR environment.

20 Claims, 9 Drawing Sheets

(56) References Cited

U.S. PATENT DOCUMENTS

| | | | |
|---|---|---|---|
| 10,451,875 B2 | 10/2019 | Sutherland et al. | |
| 10,627,635 B2 | 4/2020 | Kiemele et al. | |
| 10,665,019 B2 | 5/2020 | Hildreth et al. | |
| 10,725,297 B2 | 7/2020 | Kraver | |
| 11,003,241 B2 | 5/2021 | Dimitrov et al. | |
| 11,004,269 B2 | 5/2021 | Wilson et al. | |
| 11,113,891 B2 | 9/2021 | Noris et al. | |
| 11,169,602 B2 | 11/2021 | Lehtiniemi et al. | |
| 11,361,473 B1 | 6/2022 | Abdollahian et al. | |
| 11,435,593 B1 | 9/2022 | Sztuk et al. | |
| 11,726,320 B2 | 8/2023 | Ishihara | |
| 11,768,376 B1 | 9/2023 | Pedder et al. | |
| 12,283,002 B2 * | 4/2025 | Ichim | G06T 7/593 |
| 2012/0050143 A1 | 3/2012 | Border et al. | |
| 2012/0086624 A1 | 4/2012 | Thompson et al. | |
| 2014/0361976 A1 | 12/2014 | Osman et al. | |
| 2014/0364212 A1 | 12/2014 | Osman et al. | |
| 2016/0027212 A1 | 1/2016 | Da Veiga et al. | |
| 2016/0214015 A1 | 7/2016 | Osman et al. | |
| 2017/0068311 A1 | 3/2017 | Evans et al. | |
| 2017/0287215 A1 | 10/2017 | Lalonde et al. | |
| 2017/0337444 A1 | 11/2017 | Novak | |
| 2017/0337750 A1 | 11/2017 | McKenzie et al. | |
| 2018/0173404 A1 | 6/2018 | Smith | |
| 2018/0311583 A1 | 11/2018 | Osman et al. | |
| 2019/0035124 A1 | 1/2019 | Kapinos et al. | |
| 2021/0097766 A1 | 4/2021 | Palangie et al. | |
| 2021/0192802 A1 * | 6/2021 | Nepveu | H04N 13/117 |
| 2021/0192828 A1 | 6/2021 | Balay et al. | |
| 2021/0329121 A1 | 10/2021 | Spivack et al. | |
| 2021/0382305 A1 | 12/2021 | Chang | |
| 2022/0070238 A1 | 3/2022 | Yerli | |
| 2022/0141379 A1 | 5/2022 | Lei et al. | |
| 2022/0207837 A1 | 6/2022 | Lee et al. | |
| 2022/0292790 A1 | 9/2022 | Lohr et al. | |
| 2023/0188533 A1 | 6/2023 | LeBeau et al. | |
| 2024/0056563 A1 | 2/2024 | Nair et al. | |
| 2024/0153205 A1 * | 5/2024 | Huergo Wagner | G06T 17/00 |

OTHER PUBLICATIONS

Von Willich et al., "You Invaded my Tracking Space! Using Augmented Virtuality for Spotting Passersby in Room-Scale Virtual Reality," Proceedings of the 2019 Designing Interactive Systems Conference, Association for Computing Machinery, Jun. 18, 2019, pp. 487-496.

Lin et al., "Visualizing the keyboard in virtual reality for enhancing immersive experience," SIGGRAPH '17: Special Interest Group on Computer Graphics and Interactive Techniques Conference, Association for Computing Machinery, Jul. 30, 2017, 2 pages.

Kanamori et al., "Obstacle Avoidance Method in Real Space for Virtual Reality Immersion," 2018 IEEE International Symposium on Mixed and Augmented Reality (ISMAR), Oct. 16-20, 2018, pp. 80-89.

Hartmann et al., "RealityCheck: Blending Virtual Environments with Situated Physical Reality," Proceedings of the 2019 CHI Conference on Human Factors in Computing Systems, Association for Computing Machinery, May 2, 2019, 12 pages.

Qtipextra, "Oculus Quest: Guardian Setup and Demo", YouTube Video and transcript, 4:19, Aug. 3, 2019, https://www.youtube.com/watch?v=jxxqi7AdoeQ.

International Search Report and Written Opinion of the International Searching Authority dated Dec. 20, 2024, in connection with International Application No. PCT/US2024/013083, 7 pages.

International Search Report and Written Opinion of the International Searching Authority dated Dec. 24, 2024, in connection with International Application No. PCT/KR2024/013141, 8 pages.

* cited by examiner

PROVIDING A PASS-THROUGH VIEW OF A REAL-WORLD ENVIRONMENT FOR A VIRTUAL REALITY HEADSET FOR A USER INTERACTION WITH REAL WORLD OBJECTS

CROSS-REFERENCE TO RELATED APPLICATION AND PRIORITY CLAIM

This application claims priority under 35 U.S.C. § 119(e) to U.S. Provisional Patent Application No. 63/536,343 filed on Sep. 1, 2023, which is hereby incorporated by reference in its entirety.

TECHNICAL FIELD

This disclosure relates generally to virtual reality systems. More specifically, this disclosure relates to systems and methods for providing pass-through views of the real world environment external to a virtual reality headset.

BACKGROUND

Virtual reality (VR) technology has seen rapid advancements in recent years, immersing users in a fully digital or computer-simulated environment. While these environments can be richly detailed and engaging, users are often completely isolated from the real world around them when wearing VR headsets.

SUMMARY

This disclosure relates to systems and methods for facilitating automatic pass-through mode selection for providing a pass-through view of an external environment to a user of a VR head mounted device (HMD).

In a first embodiment, a method performed by a VR HMD includes displaying, by a display of the HMD, a VR environment, obtaining, by a processor of the HMD, a video feed of an external environment from an exterior-facing camera of the HMD, and determining, by the processor, to activate one of a plurality of pass-through modes for the video feed based on at least one of a user input or a state of the external environment, wherein the plurality of pass-through modes have different transparencies, different resolutions, or both. The method further includes rendering, by the processor based on the activated pass-through mode, the video feed for overlay onto at least a portion of the VR environment, and displaying, by the display, the rendered video feed overlaid onto the portion of the VR environment.

In a second embodiment, a VR HMD comprises a display, an exterior-facing camera, and a processor operably coupled to the display and the camera. The display is configured to display a VR environment. The exterior-facing camera is configured to create a video feed of an external environment. The processor is configured to obtain the video feed of an external environment from the camera, determine to activate one of a plurality of pass-through modes for the video feed based on at least one of a user input or a state of the external environment, wherein the plurality of pass-through modes have different transparencies, different resolutions, or both, and render, based on the activated pass-through mode, the video feed for overlay onto at least a portion of the VR environment. The display is further configured to display the rendered video feed overlaid onto the portion of the VR environment.

In a third embodiment, a non-transitory computer readable medium contains instructions that when executed cause at least one processor of an electronic device to cause a display of the device display a VR environment, obtain a video feed of an external environment from an exterior-facing camera of the device, and determine to activate one of a plurality of pass-through modes for the video feed based on at least one of a user input or a state of the external environment, wherein the plurality of pass-through modes have different transparencies, different resolutions, or both. The instructions further cause the processor to render, based on the activated pass-through mode, the video feed for overlay onto at least a portion of the VR environment, and cause the display to display the rendered video feed overlaid onto the portion of the VR environment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
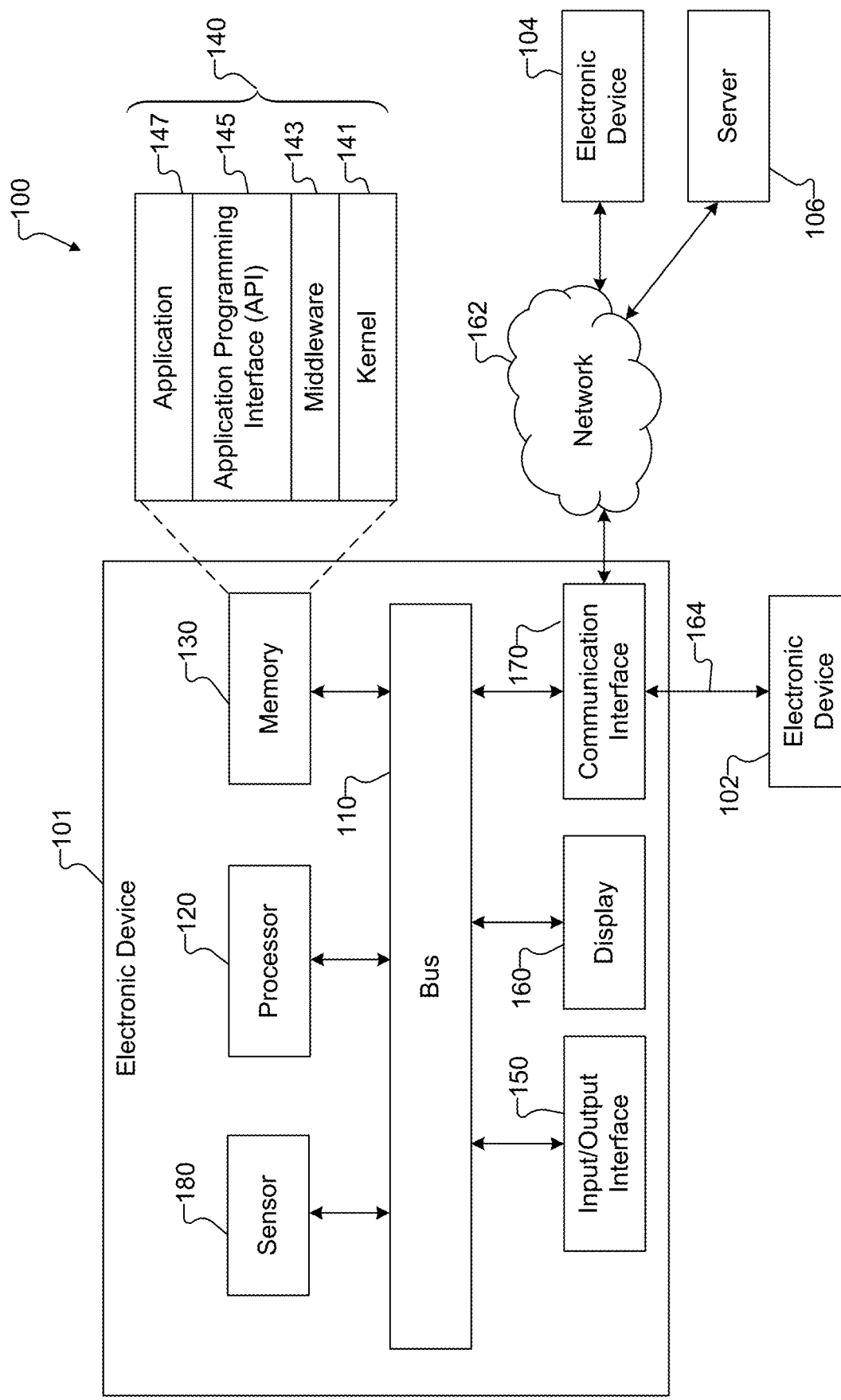
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, virtual reality (VR) technology has seen rapid advancements in recent years, immersing users in a fully digital or computer-simulated environment. While these environments can be richly detailed and engaging, users are often completely isolated from the real world around them when wearing VR headsets. There is a need for a system that provides a pass-through view of the real-world environment to allow a VR headset user to interact with real world objects as needed without removing the headset.

By design, VR headsets—or head mounted devices (HMDs)—completely block a user's vision of the real world environment external to the HMD. This is necessary to produce truly immersive VR environments with the HMD. As VR HMDs become more portable and use cases for VR diversify, however, there is increasingly a desire for users to be able to fluidly interact with the real world environment without completely exiting the VR environment. While some current VR systems do support a "pass-through" operation mode whereby a video feed from external cameras mounted on the HMD is displayed to the user, these systems can be improved upon.

Embodiments of the present disclosure recognize that current VR systems may not offer adaptable transparency or resolution settings for different user needs or scenarios, such as trying to focus while at a public place or being aware of surroundings at, e.g., a bus stop. Users may also experience disorientation due to abrupt changes between virtual and real-world visuals, if switched between VR and pass-through modes abruptly. Furthermore, embodiments of the present disclosure recognize that while in an immersive VR experience a user may want to interact with a real-world object—e.g., use a phone, grab a drink, reach for a notebook and a snack, and the like.

Currently there are limited ways for users of VR systems to customize how and when they see the real world through their VR headset. Switching between VR and pass-through modes is not context-aware. There are potential safety risks, e.g., risks of collision or accidents, due to users being unaware of their physical surroundings while immersed in VR. There is no way to register real-world objects within the VR boundary, such as a real chair to sit on while immersed in the VR experience. Additionally, users may have difficulty focusing on specific real-world objects or areas while immersed in VR, when there are possible interruptions in the external environment (i.e., servers at a café, colleagues in a room at work).

Accordingly, embodiments of the present disclosure provide systems and methods that allow users to control pass-through mode operation of a VR HMD, as well as context aware pass-through mode switching that removes friction for a user by automatically providing pass-through views of an external environment overlaid on a relevant portion of the VR environment through the VR HMD display, with different visual effects applied depending on the environmental context.

Note that while some of the embodiments discussed below are described in the context of use in consumer electronic devices (such as consumer VR HMDs), this is merely one example. It will be understood that the principles of this disclosure may be implemented in any number of other suitable contexts and may use any suitable device or devices. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to automatic pass-through mode selection for providing a pass-through view of an external environment to a user of a VR HMD. For example, as described below, the processor 120 may receive and process inputs (such as a real-time external video feed, gaze detection data, user inputs, and user movement data), select a pass-through mode from among a plurality of pass-through modes, and process the real-time external video feed based on the selected pass-through mode. The processor 120 may also instruct other devices to perform certain operations or display content on one or more displays 160 (including, e.g., a pass-through VR display).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to automatic pass-through mode selection for providing a pass-through view of an external environment to a user of a VR HMD. For example, the application 147 includes one or more applications supporting the receiving and processing of inputs (such as a real-time external video feed, gaze detection data, user inputs, and user movement data), selection of a pass-through mode from among a plurality of pass-through modes, and the processing of the real-time external video feed based on the selected pass-through mode. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may perform various operations related to automatic pass-through mode selection for providing a pass-through view of an external environment to a user of a VR HMD. For example, the server 106 may receive and process inputs (such as a real-time external video feed, gaze detection data, user inputs, and user movement data), selection of a pass-through mode from among a plurality of pass-through modes, and the processing of the real-time external video feed based on the selected pass-through mode. The server 106 may also instruct other devices to perform certain operations or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

For simplicity, embodiments of the present disclosure are described as being performed by an electronic device 101 which is a VR HMD. However, the embodiments of the present disclosure could be implemented on any other suitable device, such as a VR HMD system that comprises multiple devices, e.g., a smart phone (an electronic device 101) inserted into an HMD frame (an electronic device 102) that converts the smartphone into a VR display. It is understood that references to electronic device 101 or a VR HMD herein below are not intended to limit the present disclosure to any particular implementation of a VR display.

According to some embodiments, a user of a VR HMD may select a pass-through mode from among various different pass-through mode options. For example, the HMD system may offer an efficiency pass-through mode and a quality pass-through mode—the efficiency mode may render the pass-through video feed at a low resolution to, e.g., conserve system resources, while the quality mode may render the pass-through video feed at a high resolution to, e.g., improve legibility of text on objects rendered in the pass-through video feed. Pass-through mode selection may be performed manually by the user, or may be automatically triggered by various stimuli sensed by the HMD system. In this way, the user can choose from varying levels of resolution for different user preferences.

Figure 2A:
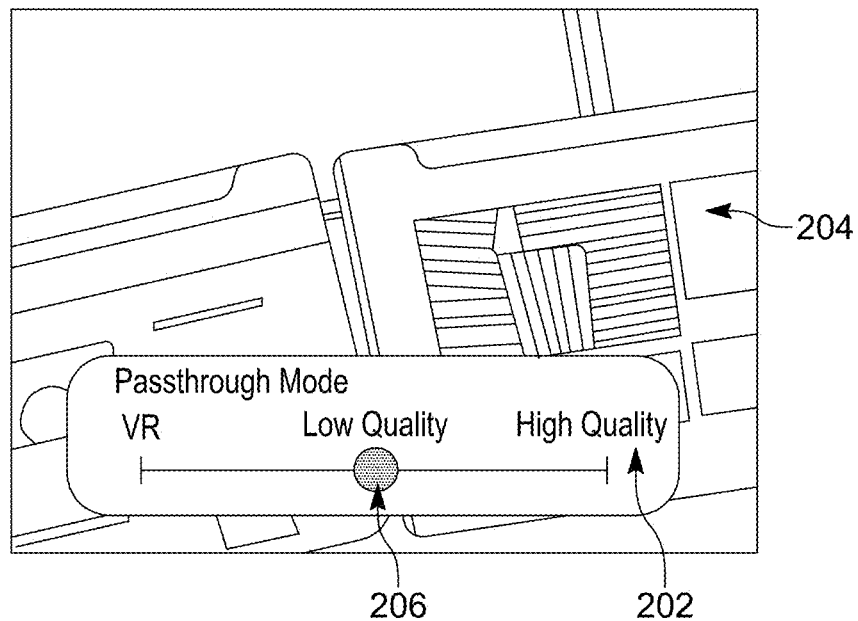
FIGS. 2A and 2B illustrate an example of a virtual user interface for pass-through mode selection in accordance with this disclosure.
Figure 2B:
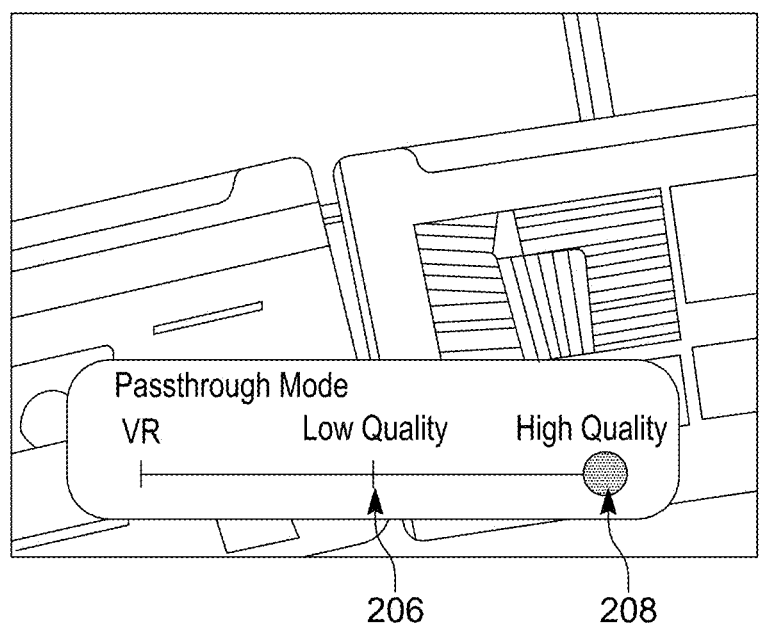

FIGS. 2A and 2B illustrate an example of a virtual user interface for pass-through mode selection in accordance with this disclosure. As shown in FIG. 2A, a virtual user interface (UI) 202 may take the form of a software-based slider overlaid onto a VR environment 204 in the VR HMD. In this example, the user has moved the slider to toggle 206 to select the low quality pass-through mode. FIG. 2B builds on the example of FIG. 2A. In this example, the user has moved the slider from toggle 206 to toggle 208 to select the high quality pass-through mode.

The user interactions in the examples of FIGS. 2A and 2B may be inputs to a software UI using a general purpose input device (e.g., a controller or virtual pointing device). Alternatively, a user may interact with physical pass-through mode controls on the VR HMD itself.

Figure 3A:
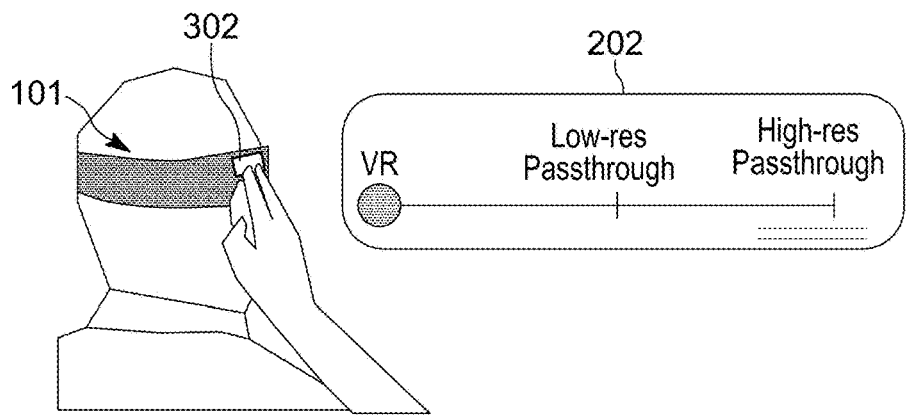
FIGS. 3A through 3C illustrate an example of a physical user interface for pass-through mode selection in accordance with this disclosure.
Figure 3B:
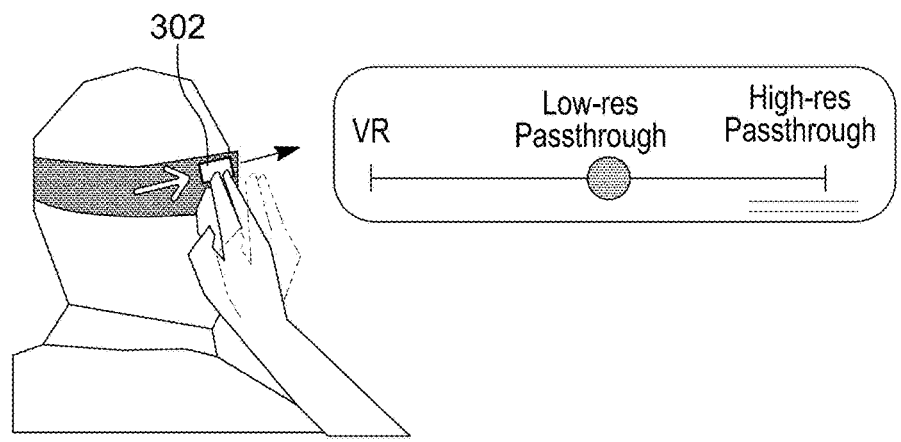
Figure 3C:
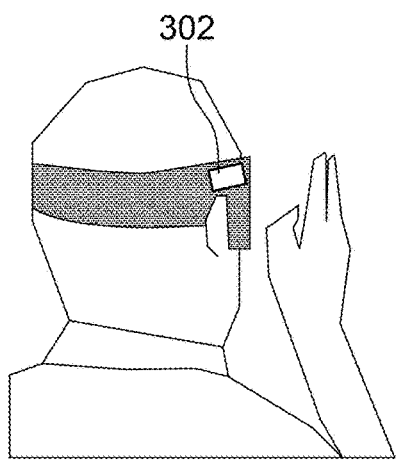

FIGS. 3A through 3C illustrate an example of a physical user interface for pass-through mode selection in accordance with this disclosure. As shown in FIG. 3A, a user activates physical controls 302, which may be touch-sensitive on an HMD 101, by placing their fingers on the controls. This may cause a virtual UI 202 to appear in the VR display.

As shown in FIG. 3B, the user interacts with the physical controls 302, such as by sliding their fingers, to cause a change in the pass-through mode selection indicated on the virtual UI 202 (e.g., from immersive VR mode to low quality pass-through mode). As shown in FIG. 3C, when the user has selected the desired pass-through mode the user releases the physical controls 302 (e.g., by removing their fingers from the controls). This may confirm the selection of the indicated pass-through mode.

According to some embodiments, the HMD system automatically selects a pass-through mode based on context awareness. For example, when a user picks up a recognizable device or tools (e.g., phone, smartwatch, notebook), the system supports the use of the device by selecting an appropriate pass-through mode (e.g., high quality mode for phone usage) and overlaying the pass-through video feed in an appropriate portion of the VR environment (e.g., the portion of the video feed that corresponds to a phone screen).

Figure 4A:
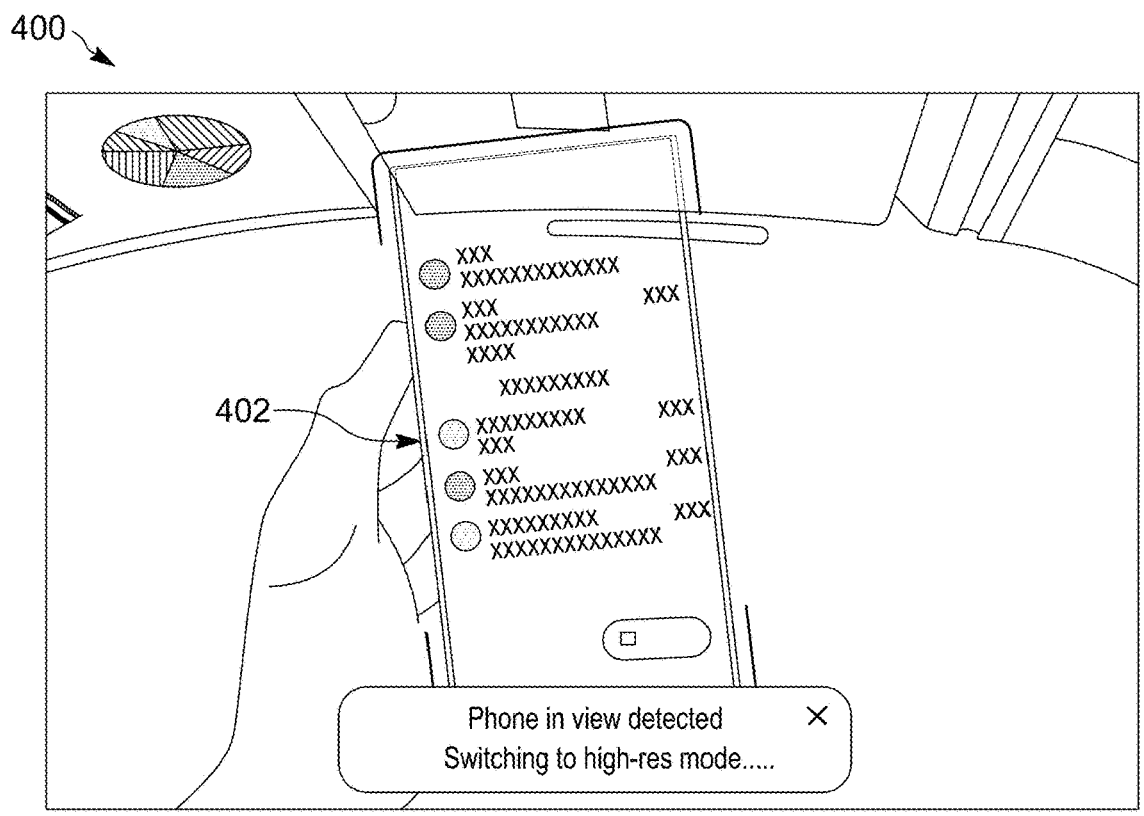
FIGS. 4A and 4B illustrate examples of context-aware automatic pass-through mode selection in accordance with this disclosure.
Figure 4B:
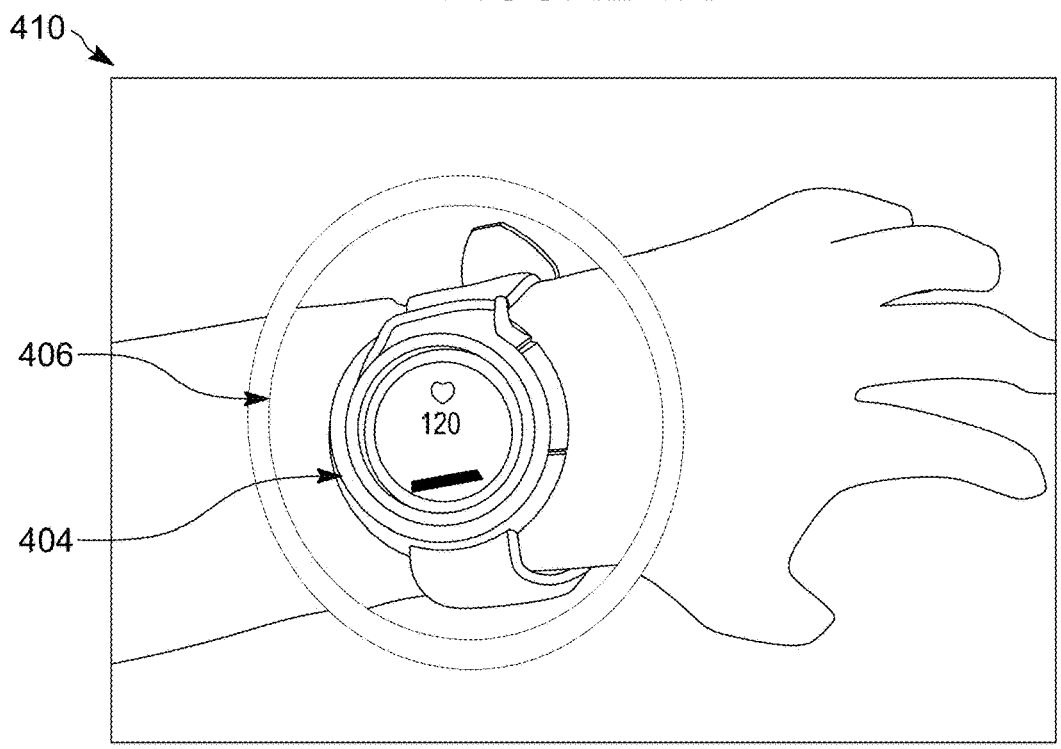

FIGS. 4A and 4B illustrate examples of context-aware automatic pass-through mode selection in accordance with this disclosure. As shown in example 400 of FIG. 4A, the HMD system recognizes that an object of interest—a smartphone 402—is present in the user's field of view in a portion of the VR environment that is displaying the external video feed overlaid in a low quality (or low resolution) pass-through mode, and automatically determines to switch to high quality (or high resolution) pass-through mode for overlay of the video feed in a portion of the VR environment that corresponds to the physical location of the smartphone screen.

Similarly, as shown in example 410 of FIG. 4B, the HMD system recognizes that the user has moved a smartwatch 404 into the user's field of view in a portion of the VR environment that is displaying the external video feed overlaid in a low quality (or low resolution) pass-through mode, and automatically determines to switch to a high quality (or high resolution) pass-through mode for overlay of the video feed in a portion 406 of the VR environment that corresponds to the physical location of the smartwatch 404. In this example, the portion 406 of the VR environment is a cut-out window that is larger than the screen of the smartwatch 404.

The HMD system may determine objects of interest in the user's field of view using computer vision techniques, gaze detection, or the like. For example, in the examples of FIGS. 4A and 4B, the HMD system may use gaze detection techniques to determine that a user's gaze point corresponds to the smartphone 402 or smartwatch 404.

As disclosed above, the HMD system may determine to implement the selected pass-through mode in only a portion of the field of view that corresponds to the recognized object of interest (e.g., the smartphone 402 or the smartwatch 404 in FIGS. 4A and 4B). The HMD system may automatically determine a cut-out or window shaped and sized to correspond to the physical shape and size of the object of interest, and render the external video feed in the selected pass-through mode (e.g., the high quality mode) only within that window. The HMD system may also automatically determine the window to be shaped and sized to include a larger area around the object of interest.

In some embodiments, one or more of the available pass-through modes render the external video feed with an effect such as a blurring effect or a frosted glass window effect. For example, a focus mode (or concentration mode) may render a portion of the external video feed with a blurring effect to allow a user to partially view what is happening in the external environment while focusing primarily on something in the VR environment (e.g., a virtual productivity application, a virtual movie screen, etc.). The blurring effect may enhance the user's ability to concentrate on the desired VR content while allowing them to react to something in the external environment if necessary.

Figure 5:
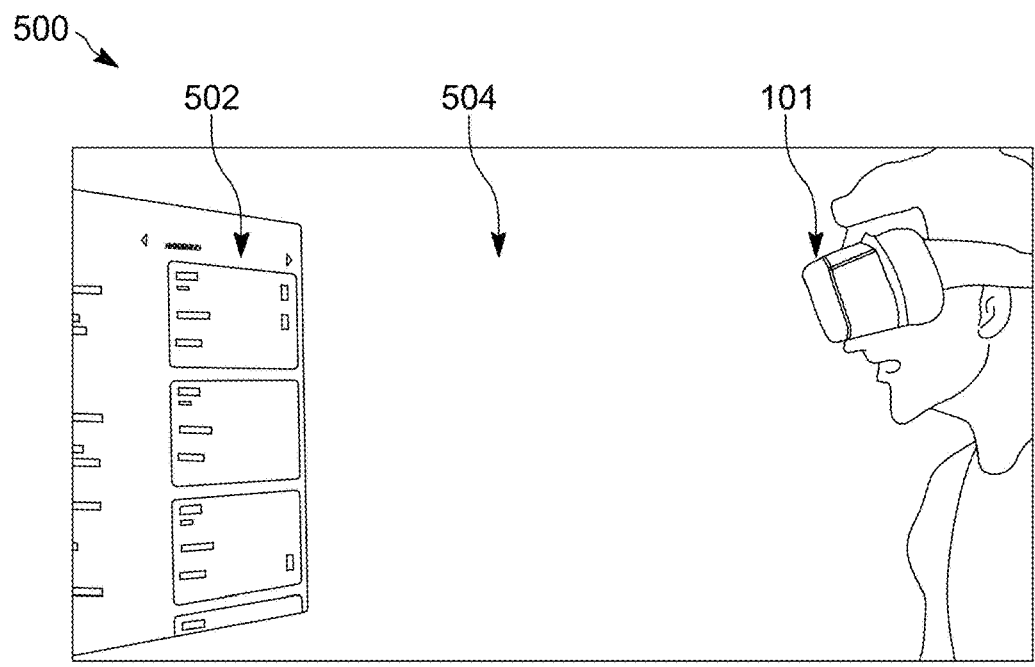
FIG. 5 illustrates an example of a blurring effect used for pass-through in accordance with this disclosure.

FIG. 5 illustrates an example 500 of a blurring effect used for pass-through in accordance with this disclosure. In the example 500 of FIG. 5, a user of a VR HMD 101 is focusing on a virtual application window 502 in the immersive VR environment. The HMD system simultaneously renders the external video feed corresponding to a portion of the external environment around the window 502 with a blurring effect according to a selected pass-through mode, and overlays the rendered video feed onto a portion 504 of the VR environment that corresponds to the VR environment around the window 502. The user is thus able to focus on being productive while being aware of the external environment.

In some embodiments, the HMD system may continually track the user's focus point (e.g., by gaze tracking) in a provided VR environment and automatically adjust pass-through modes along with behaviors of other applications to enhance the user's interaction.

Figure 6:
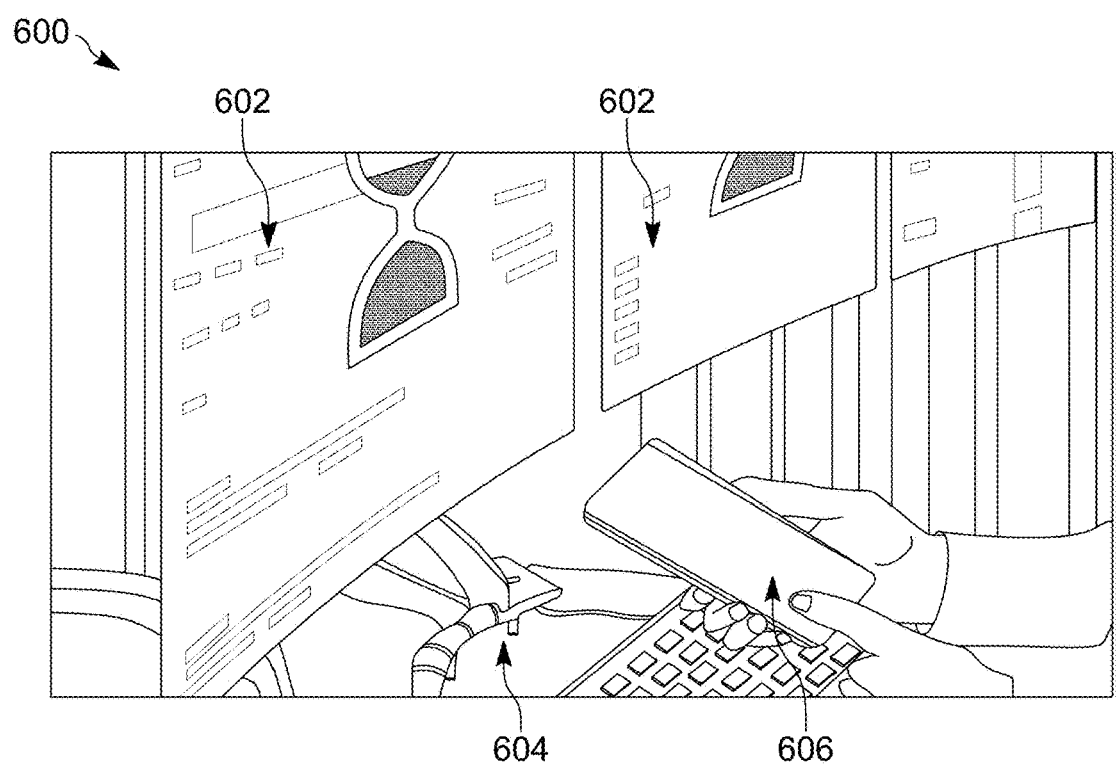
FIG. 6 illustrates an example of a procedure for enhanced interaction with a VR environment and pass-through view in accordance with this disclosure.

FIG. 6 illustrates an example 600 of a procedure for enhanced interaction with a VR environment and pass-through view in accordance with this disclosure. In the example 600 of FIG. 6, a user of a VR HMD (not illustrated) has previously opened one or more virtual application windows 602 that are displayed in the VR environment provided by the VR HMD. In a portion 604 of the VR environment (which is outside of the windows 602), the HMD system has previously overlaid the external video feed rendered in a selected pass-through mode (e.g., a low quality or blurred pass-through mode).

As shown in FIG. 6, the HMD system has detected that the user's focus has shifted away from the windows 602 towards an object 606 in the external environment, as rendered according to the previously selected pass-through mode. As a result, the HMD system automatically determines to select a different pass-through mode (e.g., a high quality pass-through mode) and apply it to the overlaid video feed in portion 604 of the VR environment, thereby supporting the user's focus on that area. In some embodiments, the HMD system may also use information on the user's focus point to further adjust the pass-through behavior near the focus point. For example, the system may apply decreased color saturation to areas of the portion 604 of the VR environment based on distance from the focus point.

Additionally, the HMD system takes actions regarding applications in the windows 602. For example, the HMD system may pause media applications, fade the windows 602 to a high transparency level, etc. This may further support the user's focus, reduce system resource usage, and the like.

The HMD system may additionally perform object recognition to determine whether to change pass-through modes. In the example 600 of FIG. 6, the system may determine that the object 606 is a smartphone, and therefore determine to change the applied pass-through mode to high quality. Alternatively, if the user were to change their focus point to an object determined by the system to be a snack or a drink, the system may determine not to change the pass-through mode (e.g., because the user may not need to be able to clearly see a snack or drink to interact with it).

In some embodiments, the HMD system may determine to change pass-through modes based on user movement. In the example of FIG. 6, if the user is seated and stands up, the HMD may detect the movement (e.g., with an accelerometer) and identify that the user is standing up. It is likely that the user wants to interact with the external environment at this point. Accordingly, the HMD system may automatically select a high quality pass-through mode for the overlaid video feed in portion 604 of the VR environment, thus supporting the user's interaction with the external environment. Additionally, the HMD system may change the portion 604 to encompass the entire VR display (i.e., to display the external video feed overlaid on the entire VR environment, completely removing the immersive VR elements).

According to some embodiments, the HMD system may include an automatic boundary alert system with multiple predefined real-world spatial boundaries established around a user (or around the HMD). For example, the system may automatically define two boundaries at different real-world distances from the HMD, thus separating the external environment into a foreground, middle ground, and background. In some embodiments, the user may adjust these distances. The HMD system may then continually track objects in the external environment based on, e.g., optical recognition performed on the external video feed, external depth sensors, or the like. When an object crosses one of the boundaries, the system may determine a pass-through mode based on various factors such as which direction the object is moving (toward or away from the HMD), which boundary it crossed, what the object is (e.g., a human, an animal, an inanimate object), and the like.

Figure 7:
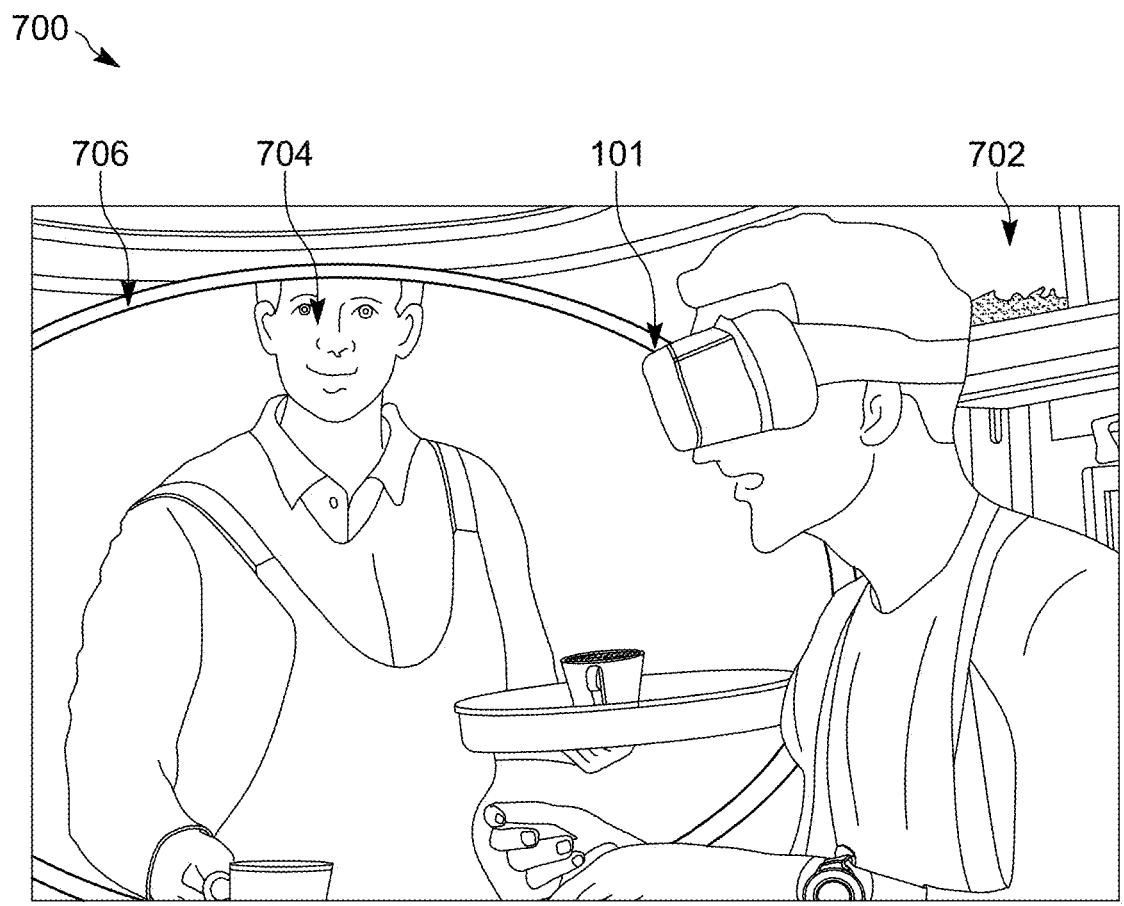
FIG. 7 illustrates an example of boundary-based pass-through mode selection in accordance with this disclosure.

FIG. 7 illustrates an example 700 of boundary-based pass-through mode selection in accordance with this disclosure. In this example, a user wearing a VR HMD 101 may be in a public environment such as a café. The user may be viewing an immersive VR environment 702. The HMD system has a boundary alert system, and has predefined spatial boundaries (not illustrated) around the user.

As shown in FIG. 7, another person 704, such as a server at the café, approaches the user. The boundary alert system may alert the user when the person 704 crosses the spatial boundaries by automatically overlaying external video feed including the person 704 onto the VR environment. This may include selecting a pass-through mode, determining a pass-through window or cut-out corresponding to the person 704, applying the selected pass-through mode to a portion of the external video feed including the person 704, then overlaying the external video feed (rendered according to the selected pass-through mode) on a portion 706 of the VR environment corresponding to the determined pass-through window.

In some embodiments, the HMD system may select different pass-through modes depending on the boundary crossed and the direction of crossing. For example, as the person 704 crosses the outer boundary moving towards the user the system may select a blurred pass-through mode, and as the person 704 crosses the inner boundary moving towards the user the system may change to a high quality pass-through mode. Then, as the person 704 moves away from the user (e.g., after taking the user's order at a café) and crosses the first boundary, the system may change to the blurred pass-through mode, then as the person 704 crosses the second boundary the system may change to the immersive VR mode. This may avoid uncomfortable or disorienting effects of the pass-through based boundary alert by gradually introducing the external pass-through object into the VR environment (or removing it from the VR environment).

The above example may also have safety-related uses. For example, if the user is physically moving through an external environment while in an immersive VR experience, objects approaching the user may include stationary, inanimate objects (such as furniture) that cross a boundary due to the user moving towards them. The HMD system may alert the user to the object's presence via haptic or audio alert to grab the user's attention, and then display the object using the above-described pass-through techniques to give the user a clear indication of the safety hazard. In such a usage, an outer boundary may be established further from the user to allow more reaction time. The system may also adjust the boundary distances dynamically based on the user's movement speed.

According to some embodiments, a user of a VR HMD may define one or more volumes in real-world space and customize pass-through behaviors of the HMD with respect to those volumes. For example, the user may instruct the HMD system to always overlay the external video feed in a pass-through window corresponding to that volume, either using a user-selected pass-through mode or using a pass-through mode selected automatically by the HMD system. Alternatively, the user may allow the HMD system to determine whether to activate a pass-through mode—and which mode to select—for the pass-through window corresponding to the user-customized volume.

Figure 8A:
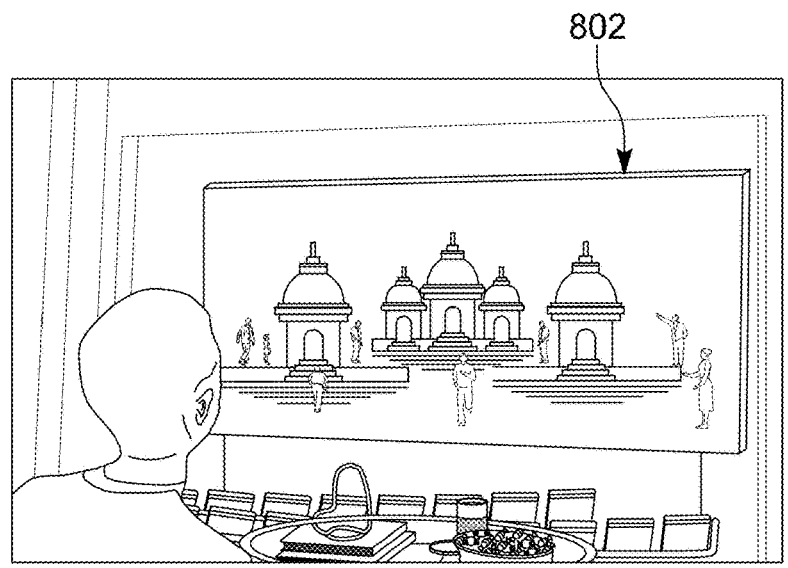
FIGS. 8A and 8B illustrate an example of user-customized pass-through windows in accordance with this disclosure.
Figure 8B:
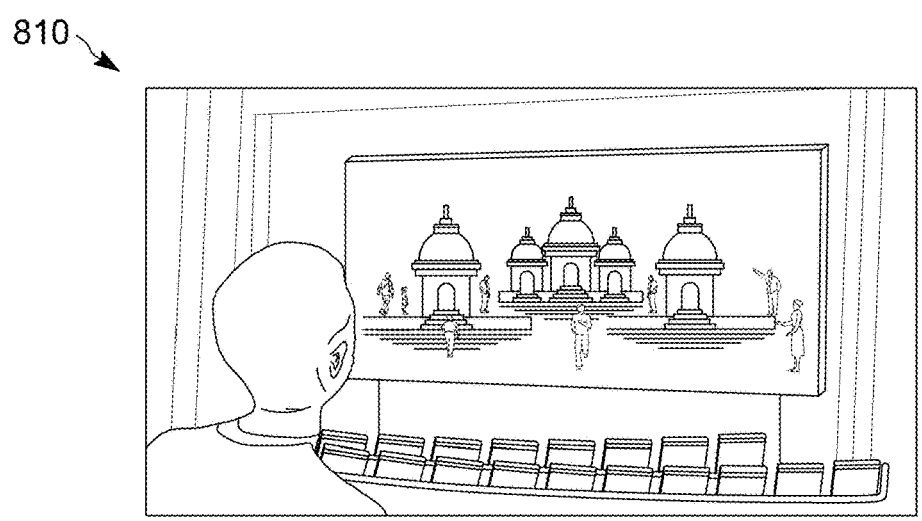
Figure 8B:
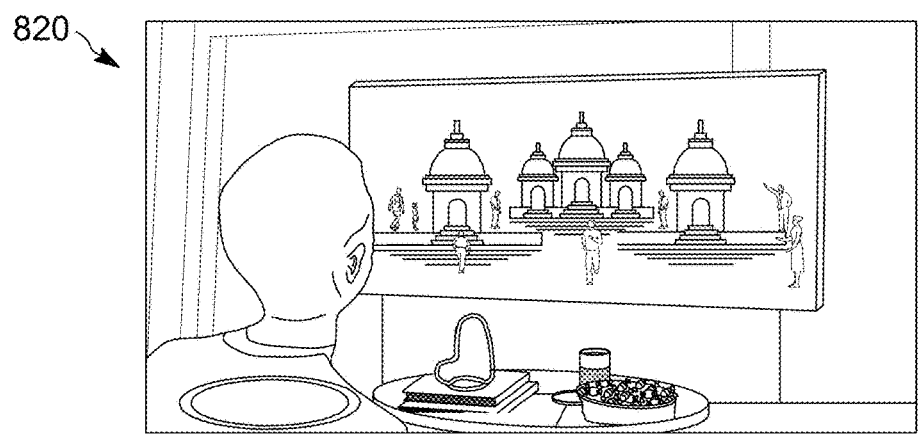

FIGS. 8A and 8B illustrate an example of user-customized pass-through windows in accordance with this disclosure. As shown in FIG. 8A, a VR HMD user is viewing media content (e.g., a movie) in a virtual movie theater, on a virtual movie screen 802 while seated in front of a real-world table. The user has placed snacks, drinks, or the like on the table, and wishes to be able to periodically pick up a snack or drink while viewing the movie. The user defines a volume 804 corresponding to the table, and instructs the HMD to activate a pass-through view of the defined volume when the HMD system detects the user interacting with that volume. For example, the HMD system may continually monitor the location and movement of the user relative to the volume 804, and determine what actions to take.

As shown in scenario 810 of FIG. 8B, for example, while the user is seated and watching the movie screen 802, the HMD may determine that the user is not moving near (or towards) the volume 804. Based on that, the HMD system determines to display the immersive VR environment in the volume 804. The user is thereby able to watch the virtual movie screen 802 undisturbed.

In scenario 820 of FIG. 8B, the user may lean towards or into the defined volume 804. The HMD may detect this motion and automatically determine to activate a pass-through mode and overlay an external video feed on the pass-through window corresponding to the volume 804. The HMD may take this action even if gaze detection indicates that the user is still watching the screen 802. Accordingly, the user may be able to see the item they are reaching for on the table in volume 804 (even if they maintain focus on the screen 802 and only use peripheral vision to locate the item on the table 804). Similarly, when the user leans back away from the volume 804, the HMD system may automatically return to displaying the immersive VR environment in the window.

In some embodiments, when defining a custom volume as disclosed with respect to FIGS. 8A and 8B, the user may be presented with a virtual UI containing various predetermined shapes to choose from. The user may be able to select one of these shapes as a starting point for further customization of the volume. In other embodiments, the HMD system may use object detection algorithms in conjunction with the external video feed to identify objects in the real-world environment, and the user may be able to select one or more of these objects and instruct the HMD to define a customized volume that corresponds to the selected objects.

In various embodiments, a virtual UI for pass-through customization may allow a user to control numerous settings related to pass-through behavior of the HMD system. This may include adjusting boundary distances for boundary alerts, adding additional boundaries for boundary alerts, customizing behavior of boundary alerts for specific boundaries, selecting behaviors associated with various pass-through modes—e.g., selecting the visual effect applied to a pass-through mode (blurring, frosted, translucent, etc.), adjusting the intensity of the visual effect, or the like—and the like.

It is understood that any of the embodiments disclosed herein may be combined in any suitable manner. For example, with respect to the example of FIGS. 8A-8B, the HMD system may set "boundaries" around the volume 804 (similar to the embodiments discussed with respect to FIG. 7), and activate different pass-through modes depending on which boundary the user moves across. The result may be that the HMD first activates a low quality (or blurred) pass-through mode as the user nears the volume 804, then changes to a high quality pass-through mode as the user enters the volume 804.

Figure 9:
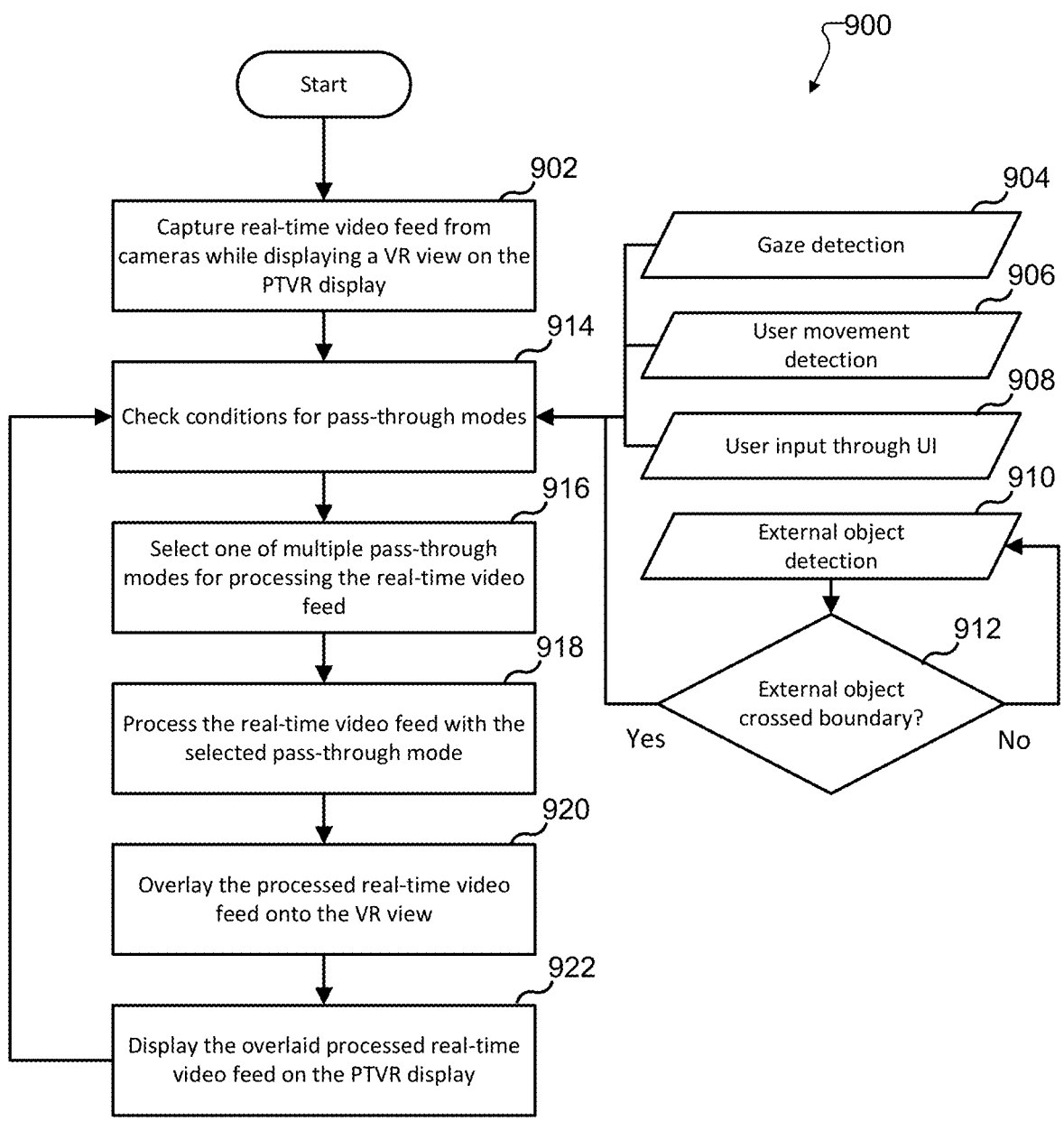
FIG. 9 illustrates an example process for pass-through mode selection in accordance with this disclosure.

FIG. 9 illustrates an example process 900 for pass-through mode selection in accordance with this disclosure. The example process 900 may be implemented by a VR HMD 101 or by any other suitable HMD system that operates a VR display with pass-through capability (referred to as a pass-through VR, or PTVR, display). The example process 900 integrates each of the embodiments discussed herein above.

At step 902, the HMD system captures a real-time external video feed from cameras connected to the HMD as the HMD system simultaneously displays a VR environment view on a PTVR display. External cameras on the HMD may capture real-time video at varying resolutions depending on the processing power of the HMD and the selected pass-through mode. For example, a high quality pass-through mode may call for a high resolution video feed, while a low quality pass-through mode may call for a lower resolution video feed to allow for faster processing.

In some embodiments, the real-time video feed is streamed to a processing unit of the HMD system that can dynamically adjust resolution and transparency based on the selected pass-through mode. For example, the video feed may initially be captured at the maximum resolution supported by the external cameras, after which the system may determine, based on the selected pass-through mode, to downscale the resolution to optimize performance or to provide a softer visual blend between the real world and virtual images. The real-world (i.e., external) video feed may be set to different transparency levels depending on user preferences or context (e.g., no transparency for complete pass-through of the real-world feed, or semi-transparency for partial pass-through of the real-world feed). These transparency settings are applied at the pixel or layer level using alpha blending techniques.

The HMD system is supplied with data inputs comprising gaze detection data 904, user movement data 906, user inputs 908 (through virtual or physical UIs), and external object detection data 910 (which the HMD system uses to determine whether an external object has crossed a predefined boundary at step 912). At step 914, the HMD system uses this data to check conditions for activating one of a plurality of pass-through modes.

The gaze detection data 904 may be derived from eye-tracking sensors that monitor the user's gaze, capturing gaze patterns to detect whether the user is focused on a real-world object or an object in the virtual environment. Eye-tracking data may be processed via an onboard processing unit or external sensors, often using machine learning algorithms to predict intention. Eye-tracking systems assess where the user is focusing. If the user looks directly at certain real-world objects or areas, a pass-through mode might be selected that increases the resolution or opacity of those objects, giving more detail and clarity to parts of the real-world feed that are in the user's focus.

The user movement data 906 may be derived from inertial measurement units (IMUs) with gyroscopes, accelerometers, and magnetometers that detect the position and movement of the HMD. This data helps identify whether the user is moving or stationary, triggering pass-through mode selection based on movement thresholds. For example, based on detected movement, the system could adjust the resolution and transparency of the pass-through video feed. For instance, fast movement may lower the resolution to maintain smooth performance, while standing still could trigger higher-resolution pass-through modes.

The user inputs 908 may be derived from a user interface (UI), which may be controlled by hand gestures, touchpads, or controllers, allowing manual input to select pass-through modes. Inputs can include gestures like tapping or swiping, or vocal commands. The user can manually adjust both the transparency and resolution of pass-through modes via hand gestures, controllers, or vocal commands. For instance, if the user wants a clearer view of the real world, they can increase the resolution or lower the transparency of the real-world video feed (or, similarly, increase the transparency of the virtual environment).

The external object detection data 910 may be derived from cameras or other sensors (e.g., LIDAR or time-of-flight sensors) that detect external objects by monitoring depth and distance from the HMD. The system may check for boundary violations at step 912 using predefined spatial thresholds (e.g., via a grid or geofencing approach) to decide when to change the pass-through mode. If an external object crosses the headset's boundary (e.g., detected via cameras or LIDAR sensors), the system may increase the transparency of the virtual environment (or decrease the transparency of the real-world video feed) to make the real world more visible, especially in areas where the object is approaching.

At step 916, the HMD system selects one of the pass-through modes for processing the real-time external video feed, and at step 918 the HMD system processes the video feed according to the selected pass-through mode. For example, the system may render the video feed with a blurring or frosted glass effect or with low resolution (e.g., low quality pass-through modes), or with high resolution and no obscuring visual effects (e.g., high quality pass-through modes).

The frosted glass effect may, for example, mimic the appearance of a scene viewed through a pane of frosted glass, or the appearance of a Japanese paper door. When using this effect the system may additionally render the video feed such that objects become more difficult to see the farther they are from the user. This obscures the real-world video feed to a very high degree, providing the user with some awareness of the real-world surroundings while keeping the potential distraction very low. In some embodiments, the frosted glass effect may only be applied to objects a threshold distance from the user, allowing closer objects to be viewed without any obscuring visual effect. The system may additionally render the video feed with low resolution to reduce the processing power required to render the video feed.

The blurring effect may provide the user with more visibility of the real-world surroundings than the frosted glass effect. For example, the video feed may be rendered with the same blurring effect regardless of distance from the user, allowing the user to be more aware of objects in the real-world surroundings while still protecting the user from distraction. Alternatively, the blurring effect may increase with distance from the user, but objects may still be rendered with more detail than provided by the frosted glass effect. In some embodiments, the blurring effect may only be applied to objects a threshold distance from the user, allowing closer objects to be viewed without any obscuring visual effect.

The system may additionally render the video feed with low resolution to reduce the processing power required to render the video feed.

Additionally, the system may render both a low quality and high quality pass-through mode without any added visual effects. In this case, if the low quality pass-through mode is selected, the system may simply render the real-world video feed with low resolution. If the high quality pass-through mode is selected, the system may render the real-world video feed with high resolution.

At step 918, the system may process the real-world video feed by adjusting the resolution and applying an obscuring visual effect (e.g., by adjusting transparency). For example, the system may downscale the video feed for increased performance when lower resolution is called for. The transparency level may be controlled by adjusting the alpha channel in the image stream, which mixes real-world and virtual layers according to the selected pass-through mode. Algorithms may dynamically adjust the resolution of the real-world video feed based on processing capacity or situational needs, such as lowering the resolution when the system is under heavy load or increasing it for fine details.

At step 920, the HMD system overlays the processed real-time external video feed onto the VR view (or a portion thereof). A compositing engine may apply different transparency levels for real-world objects or regions of the video feed. For example, virtual elements might remain more opaque, while real-world objects are blended in with adjustable transparency levels. Different regions of the real-world video feed may be rendered with different resolutions, especially if the system uses techniques like foveated rendering, in which the resolution is higher near the center of the user's gaze and lower at the periphery of the user's gaze. The system may integrate real-world objects by positioning them in the 3D space relative to the virtual world, with varying transparency and resolution based on the object's depth and relevance to the user's focus.

At step 922 the HMD system displays the overlaid processed real-time external video feed on the PTVR display. The final output combines the virtual environment with the processed real-world view, applying both transparency and resolution modifications. The display system may make real-time adjustments for transparency, making the overlay more opaque or transparent depending on user interaction or system triggers (e.g., user input, object detection, and the like). The display may additionally optimize the resolution of the final feed based on performance requirements, dynamically adjusting to maintain smooth frame rates while ensuring clarity for critical real-world objects.

Although FIG. 9 illustrates one example of a process 900, supporting pass-through mode selection by a VR HMD system from a plurality of pass-through modes, various changes may be made to FIG. 9. For example, various steps in FIG. 9 may be combined, further subdivided, replicated, or rearranged according to particular needs. Also, one or more additional steps may be included if needed or desired.

Figure 10:
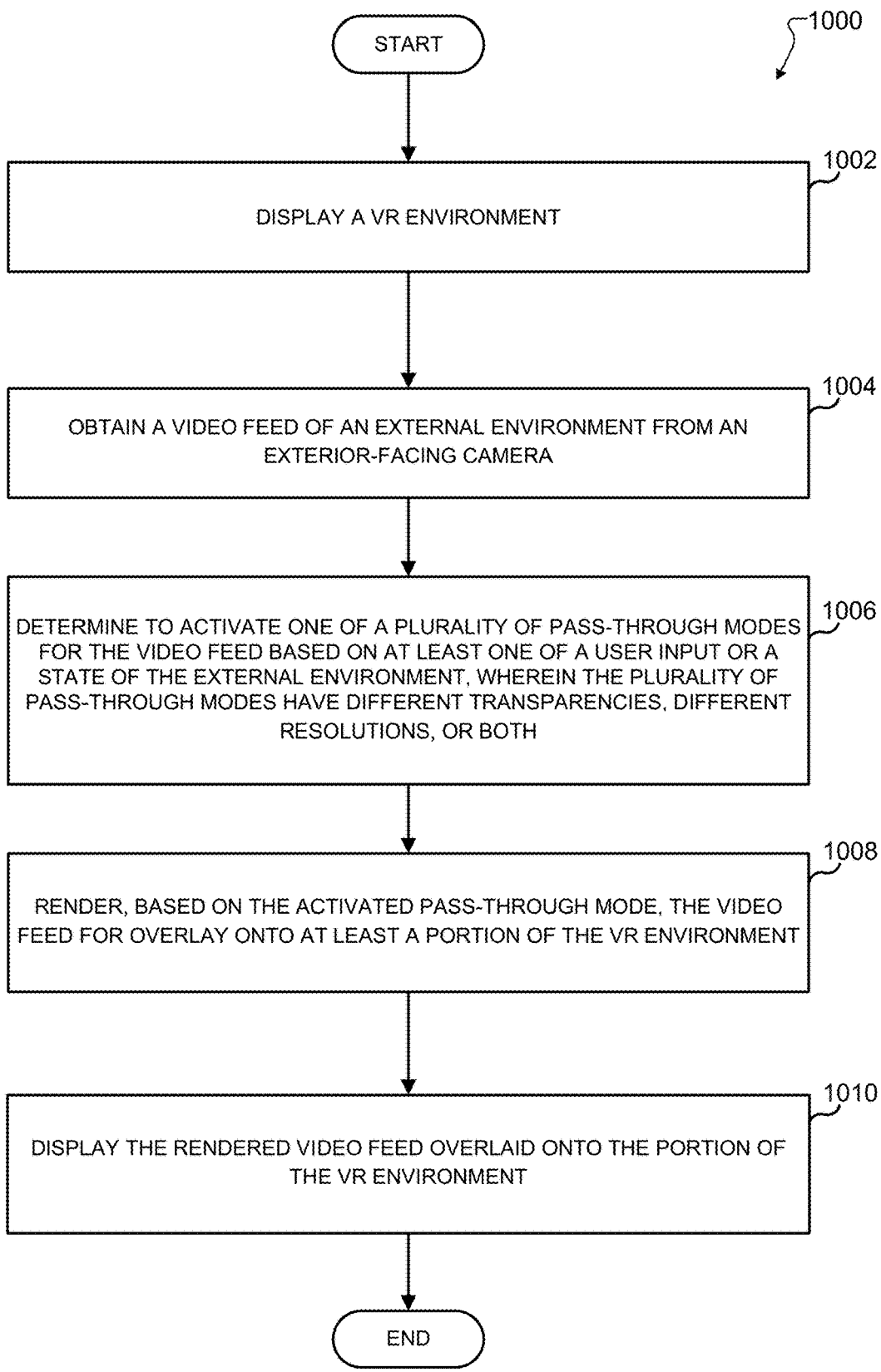
FIG. 10 illustrates an example method for facilitating automatic pass-through mode selection for providing a pass-through view of an external environment to a user of a VR HMD in accordance with this disclosure.

FIG. 10 illustrates an example method 1000 for facilitating automatic pass-through mode selection for providing a pass-through view of an external environment to a user of a VR HMD in accordance with this disclosure. For case of explanation, the method 1000 shown in FIG. 10 is described as being performed using a VR HMD as the electronic device 101 in the network configuration 100 of FIG. 1. However, the method 1000 could be performed using any other suitable device(s), such as the server 106, and in any other suitable system(s). As a particular example, portions of the method 1000 can be executed on the server 106 in the network configuration 100 of FIG. 1, and selected pass-through modes can be provided to a client electronic device 101 for display.

At block 1002, the VR HMD displays, on a display of the HMD, a VR environment. At block 1004, a processor of the HMD obtains a video feed of an external environment from an exterior-facing camera of the HMD. At block 1006, the processor determines to activate one of a plurality of pass-through modes for the video feed based on at least one of a user input or a state of the external environment, wherein the plurality of pass-through modes have different transparencies, different resolutions, or both. The plurality of pass-through modes may comprise, for example, a first pass-through mode having a first transparency level and a second pass-through mode having a second transparency level that is higher than the first transparency level.

In some embodiments in which the processor determines to activate one of the plurality of pass-through modes for the video feed based on a user input, the processor may receive the user input through a software user interface or a hardware control of the HMD, detect a gaze point of a user as the user input, or detect a movement of the user as the user input.

In some embodiments in which the processor determines to activate one of the plurality of pass-through modes for the video feed based on the state of the external environment, the processor may set a first boundary a first distance from the HMD and a second boundary a second distance from the HMD, wherein the second distance is greater than the first distance, detect, from the video feed, an object in the external environment crossing the first or second boundary, and determine to activate a first pass-through mode based on the object crossing the first boundary or a second pass-through mode based on the object crossing the second boundary.

At block 1008, the processor renders, based on the activated pass-through mode, the video feed for overlay onto at least a portion of the VR environment. Referring to the example first and second transparency levels described with respect to block 1006, rendering the video feed based on the activated pass-through mode being the first pass-through mode may comprise rendering the video feed with a blurred or frosted glass effect.

At block 1010, the display displays the rendered video feed overlaid onto the portion of the VR environment. In some embodiments, the processor may further render the VR environment with a blurred effect based on the rendered video feed being overlaid onto the portion of the VR environment.

In some embodiments, the processor receives a second user input that defines the portion of the VR environment as corresponding to a spatial volume in the external environment. When the processor detects a movement of a user towards the spatial volume, the processor may determine the one of the plurality of pass-through modes to activate based on the detected movement.

Although FIG. 10 illustrates one example of a method 1000 for facilitating automatic pass-through mode selection for providing a pass-through view of an external environment to a user of a VR HMD, various changes may be made to FIG. 10. For example, while shown as a series of steps, various steps in FIG. 10 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method performed by a virtual reality (VR) head mounted electronic device (HMD), the method comprising:
displaying, by a display of the HMD, a VR environment;
obtaining, by a processor of the HMD, a video feed of an external environment from an exterior-facing camera of the HMD;
determining, by the processor, to activate one of a plurality of pass-through modes for the video feed based on at least one of a user input or a state of the external environment, wherein the plurality of pass-through modes have different transparencies, different resolutions, or both;
rendering, by the processor based on the activated pass-through mode, the video feed for overlay onto at least a portion of the VR environment;
displaying, by the display, the rendered video feed overlaid onto the portion of the VR environment;
defining the portion of the VR environment as corresponding to a spatial volume in the external environment;
detecting, by the processor, movement towards the spatial volume; and
determining the one of the plurality of pass-through modes to activate based on the detected movement.

2. The method of claim 1, wherein the plurality of pass-through modes comprises:
a first pass-through mode having a first transparency level, and
a second pass-through mode having a second transparency level that is higher than the first transparency level.

3. The method of claim 2, wherein rendering the video feed based on the activated pass-through mode being the first pass-through mode comprises rendering the video feed with a blurred or frosted glass effect.

4. The method of claim 1, wherein determining to activate one of the plurality of pass-through modes for the video feed based on the user input further comprises:
receiving, by the processor, the user input through a software user interface or a hardware control of the HMD;
detecting, by the processor, a gaze point of a user as the user input; or
detecting, by the processor, a movement of the user as the user input.

5. The method of claim 1, wherein determining to activate one of the plurality of pass-through modes for the video feed based on the state of the external environment further comprises:
setting, by the processor, a first boundary a first distance from the HMD and a second boundary a second distance from the HMD, wherein the second distance is greater than the first distance;
detecting, by the processor from the video feed, an object in the external environment crossing the first or second boundary; and
determining, by the processor, to activate a first pass-through mode based on the object crossing the first boundary or a second pass-through mode based on the object crossing the second boundary.

6. The method of claim 1, further comprising:
receiving, by the processor, a second user input that defines the portion of the VR environment as corresponding to the spatial volume in the external environment,
wherein the detected movement comprises movement of a user towards the spatial volume.

7. The method of claim 1, further comprising rendering, by the processor, the VR environment with a blurred effect based on the rendered video feed being overlaid onto the portion of the VR environment.

8. A virtual reality (VR) head mounted electronic device (HMD) comprising:
a display configured to display a VR environment;
an exterior-facing camera configured to create a video feed of an external environment; and
a processor operably coupled to the display and the camera and configured to:
obtain the video feed of an external environment from the camera,
determine to activate one of a plurality of pass-through modes for the video feed based on at least one of a user input or a state of the external environment, wherein the plurality of pass-through modes have different transparencies, different resolutions, or both,
render, based on the activated pass-through mode, the video feed for overlay onto at least a portion of the VR environment,
wherein the display is further configured to display the rendered video feed overlaid onto the portion of the VR environment,
define the portion of the VR environment as corresponding to a spatial volume in the external environment,
detect, by the processor, movement towards the spatial volume, and
determine the one of the plurality of pass-through modes to activate based on the detected movement.

9. The VR HMD of claim 8, wherein the plurality of pass-through modes comprises:
a first pass-through mode having a first transparency level, and
a second pass-through mode having a second transparency level that is higher than the first transparency level.

10. The VR HMD of claim 9, wherein the processor is further configured to render the video feed with a blurred or frosted glass effect based on the first pass-through mode being the activated pass-through mode.

11. The VR HMD of claim 8, wherein the processor configured to determine to activate one of the plurality of pass-through modes for the video feed based on the user input is configured to:
receive the user input through a software user interface or a hardware control of the HMD;
detect a gaze point of a user as the user input; or
detect a movement of the user as the user input.

12. The VR HMD of claim 8, wherein the processor configured to determine to activate one of the plurality of pass-through modes for the video feed based on the state of the external environment is configured to:
set a first boundary a first distance from the HMD and a second boundary a second distance from the HMD, wherein the second distance is greater than the first distance;

detect, from the video feed, an object in the external environment crossing the first or second boundary; and determine to activate a first pass-through mode based on the object crossing the first boundary or a second pass-through mode based on the object crossing the second boundary.

13. The VR HMD of claim 8, wherein the processor is further configured to:

receive a second user input that defines the portion of the VR environment as corresponding to the spatial volume in the external environment, wherein the detected movement comprises movement of a user towards the spatial volume.

14. The VR HMD of claim 8, wherein the processor is further configured to render the VR environment with a blurred effect based on the rendered video feed being overlaid onto the portion of the VR environment.

15. A non-transitory computer readable medium containing instructions that when executed cause at least one processor of an electronic device to:

cause a display of the device to display a virtual reality (VR) environment;

obtain a video feed of an external environment from an exterior-facing camera of the device;

determine to activate one of a plurality of pass-through modes for the video feed based on at least one of a user input or a state of the external environment, wherein the plurality of pass-through modes have different transparencies, different resolutions, or both;

render, based on the activated pass-through mode, the video feed for overlay onto at least a portion of the VR environment;

cause the display to display the rendered video feed overlaid onto the portion of the VR environment;

define the portion of the VR environment as corresponding to a spatial volume in the external environment;

detect, by the processor, movement towards the spatial volume; and determine the one of the plurality of pass-through modes to activate based on the detected movement.

16. The non-transitory computer readable medium of claim 15, wherein the plurality of pass-through modes comprises:

a first pass-through mode having a first transparency level, and a second pass-through mode having a second transparency level that is higher than the first transparency level.

17. The non-transitory computer readable medium of claim 16, further containing instructions that when executed cause the at least one processor to render the video feed with a blurred or frosted glass effect based on the first pass-through mode being the activated pass-through mode.

18. The non-transitory computer readable medium of claim 15, wherein the instructions that when executed cause the at least one processor to determine to activate one of the plurality of pass-through modes for the video feed based on the user input further cause the at least one processor to:

receive the user input through a software user interface or a hardware control of the device;

detect a gaze point of a user as the user input; or detect a movement of the user as the user input.

19. The non-transitory computer readable medium of claim 15, wherein the instructions that when executed cause the at least one processor to determine to activate one of the plurality of pass-through modes for the video feed based on the state of the external environment further cause the at least one processor to:

set a first boundary a first distance from the device and a second boundary a second distance from the device, wherein the second distance is greater than the first distance;

detect, from the video feed, an object in the external environment crossing the first or second boundary; and determine to activate a first pass-through mode based on the object crossing the first boundary or a second pass-through mode based on the object crossing the second boundary.

20. The non-transitory computer readable medium of claim 15, further containing instructions that when executed cause the at least one processor to:

receive a second user input that defines the portion of the VR environment as corresponding to the spatial volume in the external environment, wherein the detected movement comprises movement of a user towards the spatial volume.

* * * * *